United States Patent [19]
Jensen et al.

[11] Patent Number: 6,061,134
[45] Date of Patent: May 9, 2000

[54] MODULATED FOURIER TRANSFORM RAMAN FIBER-OPTIC SPECTROSCOPY

[75] Inventors: Brian J. Jensen, Williamsburg; John B. Cooper, Virginia Beach; Kent L. Wise, Portsmouth, all of Va.

[73] Assignees: The United States of America as represented by the Administrator of the National Aeronautics and Space Administration, Washington, D.C.; Old Dominion University Research Foundation, Norfolk, Va.

[21] Appl. No.: 09/316,176

[22] Filed: May 21, 1999

Related U.S. Application Data

[60] Provisional application No. 60/088,697, May 22, 1998.
[51] Int. Cl.[7] ........................................................ G01B 9/02
[52] U.S. Cl. ............................................ 356/346; 356/345
[58] Field of Search .................................... 356/345, 346

[56] References Cited

U.S. PATENT DOCUMENTS

| | | |
|---|---|---|
| 5,112,127 | 5/1992 | Carrabba et al. . |
| 5,247,343 | 9/1993 | Burch . |
| 5,351,121 | 9/1994 | Baer et al. . |
| 5,661,557 | 8/1997 | Da Silva et al. . |
| 5,786,893 | 7/1998 | Fink et al. . |
| 5,870,188 | 2/1999 | Ozaki et al. . |

Primary Examiner—Robert H. Kim
Attorney, Agent, or Firm—Kurt G. Hammerle

[57] ABSTRACT

A modification to a commercial Fourier Transform (FT) Raman spectrometer is presented for the elimination of thermal backgrounds in the FT Raman spectra. The modification involves the use of a mechanical optical chopper to modulate the continuous wave laser, remote collection of the signal via fiber optics, and connection of a dual-phase digital-signal-processor (DSP) lock-in amplifier between the detector and the spectrometer's collection electronics to demodulate and filter the optical signals. The resulting Modulated Fourier Transform Raman Fiber-Optic Spectrometer is capable of completely eliminating thermal backgrounds at temperatures exceeding 300° C.

9 Claims, 11 Drawing Sheets

MODULATED FOURIER TRANSFORM RAMAN FIBER-OPTIC SPECTROSCOPY

CLAIM OF BENEFIT OF PROVISIONAL APPLICATION

Pursuant to 35 U.S.C. §119, the benefit of priority from provisional application 60/088,697 with a filing date of May 22, 1998, is claimed for this non-provisional application.

ORIGIN OF INVENTION

The invention described herein was jointly made by employees of the United States Government and a NASA Contractor employee in the performance of work under NASA Grant NGT-1-52124. In accordance with 35 U.S.C. 202, the contractor as elected not to retain title.

BACKGROUND OF THE INVENTION

1. Field of the Invention

The present invention relates generally to the field of spectroscopy and particularly to Fourier transform Raman spectrometry.

2. Description of the Related Art

In Raman spectroscopy, a laser beam is directed onto a sample and the radiation reflected from the sample is collected, passed through an interferometer, and then detected. The reflected radiation is characterized by a strong component, known as the Rayleigh line, at the wavelength of the laser, with weaker secondary components, known as the "Stokes" and "anti-Stokes" lines, at wavelengths slightly above and below the laser wavelength. The Stokes and anti-Stokes lines are referred to collectively as the "Raman" lines. The objective in Raman spectroscopy is to analyze the Stokes and/or anti-Stokes lines for spectral information about the sample.

The Raman scattering effect is illustrated in FIG. 1. For example, using an Nd:YAG laser as the excitation source, the sample is raised to an excitation level equal to that of the source and it then decays in one of three possible ways. It can fall back to its original ground state, to the next higher energy state, or, if the original state was the first electronic state as expected by Boltzman's distribution, from the first electronic state to the ground state. These three possibilities result in the Rayleigh scattering, Stokes scattering, and anti-Stokes scattering, respectively.

A typical Raman spectrometer arrangement is shown in FIG. 2. The light beam 20 from a laser 21 is reflected by mirrors 22 and 23 to sample collection optics 25 which allows the beam 20 to strike the sample 27 and then collects the reflected radiation and collimates it into a beam 29. The beam of reflected radiation 29 is passed through a stack of filters 30 before the beam proceeds into an interferometer 32 (e.g., a Michelson interferometer shown schematically as having a beam splitter 34, a moving mirror 35 and a stationary mirror 36). After passing through the interferometer, the beam 37 is collected by optics shown schematically at 39 and focused onto a detector 40. To achieve sufficient attenuation of the Rayleigh line, the stack of filters 30, typically dielectric filters, produce attenuation of the Rayleigh line on the order of $10^{-6}$. Dielectric filters are conventionally edge filters, which attenuate either the Stokes or anti-Stokes line as well as the Rayleigh line. The throughput of the passband of the filter is reduced by each additional filter. A throughput of only 30% of the desired Raman wavelengths would be typical for a five filter stack typically required to achieve $10^{-6}$ attenuation of the Rayleigh line.

Recent developments in the aerospace industry have substantially increased the use of fiber-optic Raman spectroscopy to monitor the high temperature curing of high performance polymers. One approach which has been successful is the use of a dispersive Raman instrument using short-wavelength near-Infrared (IR) radiation (~800 nanometers). Although this approach is feasible for many polymer cures, polymers which are highly fluorescent still present an obstacle. In particular, modified polyimides represent the largest and most promising class of high-temperature polymers and yet cannot be analyzed with dispersive instruments due to their intense fluorescence. Because Fourier Transform (FT) Raman instruments have a longer wavelength excitation, they allow the acquisition of polyimide Raman spectra at room temperature, but these spectra cannot be acquired within an autoclave or high-temperature oven in real time due to the thermal background which occurs at the high temperatures required for processing the polyimide. This ability for real-time in-situ monitoring is crucial if intelligent feedback systems based on direct chemical information are to be designed for processing autoclaves.

Several researchers have addressed the problem of thermal backgrounds in FT-Raman spectra. Cutler et al have successfully removed thermal backgrounds by synchronizing a Q-switched pulsed laser to the interferometer reference laser fringe crossings and adjusting the A/D sampling of the spectrometer so that it coincides with the peak of the detector pulses. This approach has also been used in combination with a fast analog filter to improve signal-to-noise ratio and to discriminate against long lived backgrounds. A second improvement is the use of a ratioing circuit to minimize pulse-to-pulse fluctuations of the Q-switched laser and thus further improve the signal-to-noise ratio. Sakamoto and coworkers have developed an asynchronous method to eliminate thermal backgrounds using a Q-switched pulsed laser in combination with a gate circuit and a low pass filter which avoids the necessity to trigger the laser using the interferometer reference laser fringe crossings. One drawback of all of these approaches is that the fast modulation frequencies of the Q-switched laser require that slow mirror velocities be used, ultimately resulting in a longer acquisition time relative to a conventional FT-Raman spectrometry experiment. In addition, the short laser pulse widths (ranging from 7–100 ns) and thus high laser peak powers result in a greater probability of laser-induced sample heating.

Bennett has also described an approach using a diode-pumped pulsed laser in combination with a sample and hold circuit which is triggered off of the A/D converter. This approach can be performed either synchronously or asynchronously (with respect to the A/D sampling), however, either method requires specialty software to reconstruct the Raman spectrum. In addition, Bennett states that optimum performance is achieved at slow interferometer mirror velocities (0.1 cm/s) which results in longer acquisition times. Recently, Petty has described a method to eliminate thermal backgrounds using a modulated laser and a step-scan FT-Raman spectrometer. Although successful, the step-scan experiment requires much longer acquisition times when compared to a conventional FT-Raman spectrometer.

Although all of these approaches describe an increase in signal-to-noise relative to a conventional FT-Raman spectrometer, the comparison is not strictly valid because a conventional spectrometer could utilize much faster mirror velocities and acquire more spectra in an equivalent time period, which would result in a signal averaging improvement in the signal-to-noise ratio for the conventional spectrometer. In addition, all of the described methods require rather involved and costly modifications to a commercial continuous wave (CW) laser FT-Raman spectrometer. Moreover, none of these existing methods have been demonstrated to remove thermal backgrounds at temperatures of 300° C. or greater.

SUMMARY OF THE INVENTION

Accordingly, a primary object of the present invention is to use a Raman spectrometer for in-situ, remote monitoring of high-temperature reactions in real-time.

Another object is to eliminate in real-time the thermal backgrounds of Fourier Transform Raman spectra.

A further object of the invention is to increase the signal-to-noise ratio of a Fourier Transform Raman spectrometer.

Yet another object of the present invention is to eliminate thermal backgrounds at temperatures in excess of 300° C.

The foregoing and additional objects of the invention are attained by an apparatus and method for remotely monitoring in real-time the reactions of a sample located in a high-temperature oven. The apparatus for analyzing the sample comprises a Fourier Transform (FT) Raman spectrometer, a rotating mechanical optical chopper, a fiber-optic probe, and a dual phase, digital signal processor (DSP) lock-in amplifier. The FT Raman spectrometer includes a continuous wave laser, sample collection optics, an interferometer having a moving mirror, a detector, and a computer.

The rotating optical chopper is positioned between the sample and the continuous wave laser and modulates the electromagnetic radiation of the continuous wave laser into pulses. Preferably, the wavelength of the electromagnetic radiation is 1064 nanometers. The fiber-optic probe remotely transmits the pulsed electromagnetic radiation onto the sample in the oven and then transmits the reflected electromagnetic radiation from the sample back to the FT Raman spectrometer. After the sample collection optics and the interferometer manipulate the reflected electromagnetic radiation into an interference beam, the detector receives the interference beam and generates an electronic digital output signal. This signal is fed into the dual phase DSP lock-in amplifier.

The lock-in amplifier is referenced to the frequency of the chopping of the optical chopper, and the phases of the optical chopper and the lock-in amplifier are synchronized to facilitate demodulation of the interference beam. The lock-in amplifier thus demodulates the output signal of the detector in a manner dependent upon both the maximum Stokes Raman wavenumber and the maximum anti-Stokes Raman wavenumber of the sample and upon the velocity of the moving mirror. The lock-in amplifier also low-pass filters the output signal in a manner dependent upon the maximum anti-Stokes Raman wavenumber of the sample, the wavenumber of the CW laser, and the velocity of the mirror. This step of demodulating and low-pass filtering removes the thermal component of the Raman spectra reflected from the sample. The demodulated, filtered signal of the lock-in amplifier is then transmitted to the computer for Fourier-Transform processing and spectral acquisition.

The method for remotely monitoring high-temperature reactions of a sample in real-time comprises: (a) chopping electromagnetic radiation suitable for Raman spectrometry; (b) transmitting the electromagnetic radiation remotely onto the sample at high-temperature; (c) receiving the reflected electromagnetic radiation remotely from the sample, the reflected electromagnetic radiation including a thermal background; (d) manipulating the reflected electromagnetic radiation into an interference beam; (e) demodulating and low-pass filtering the interference beam to remove the thermal background from the electronic signal, and (f) performing a Fourier transform on the electronic signal to generate a Raman spectrum.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the claims.

DETAILED DESCRIPTION OF THE PREFERRED EMBODIMENTS

Figure 1:
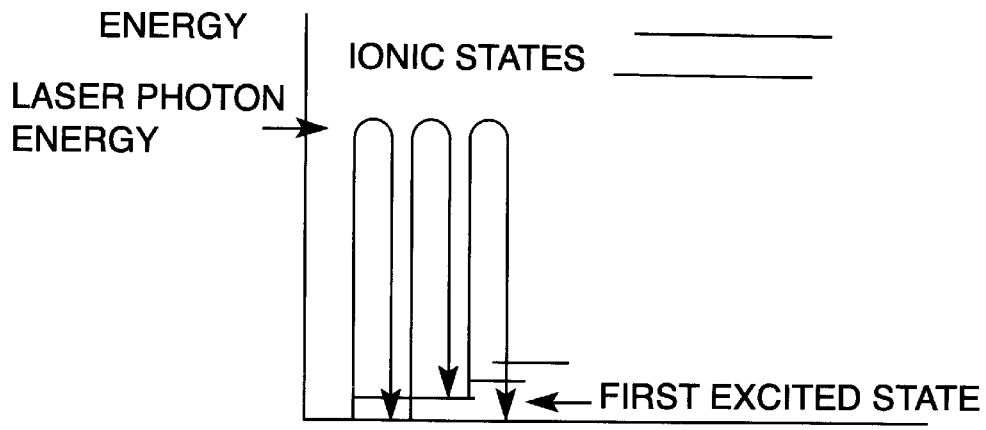
FIG. 1 is a simplified graph illustrating the Raman scattering effect.
Figure 2:
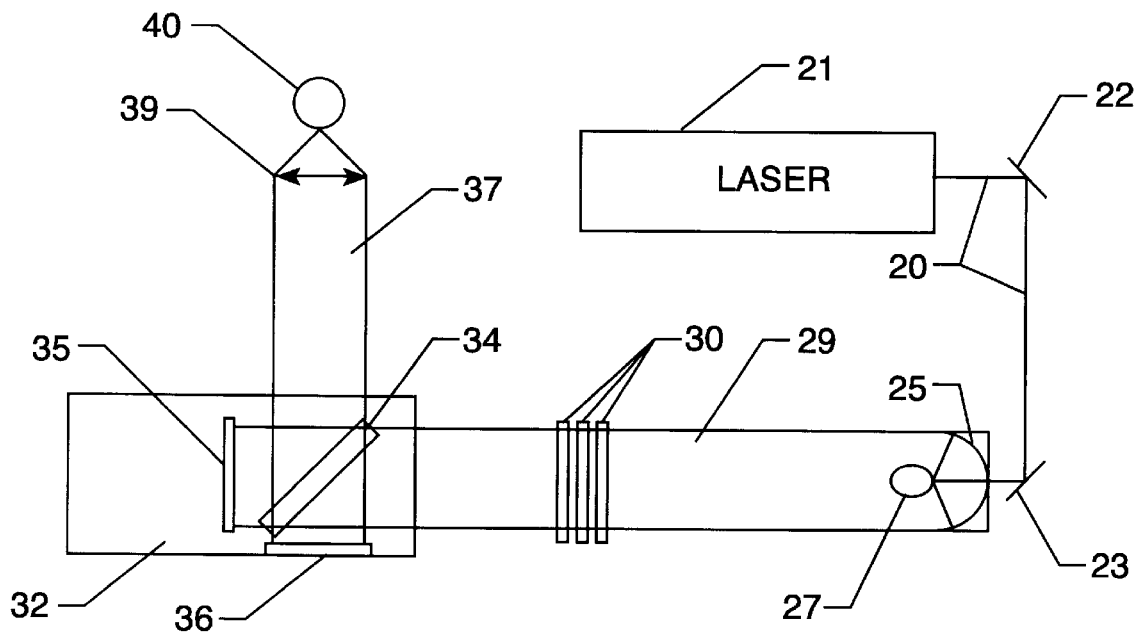
FIG. 2 is a schematic view of a Raman spectrometer in accordance with the prior art.
Figure 3:
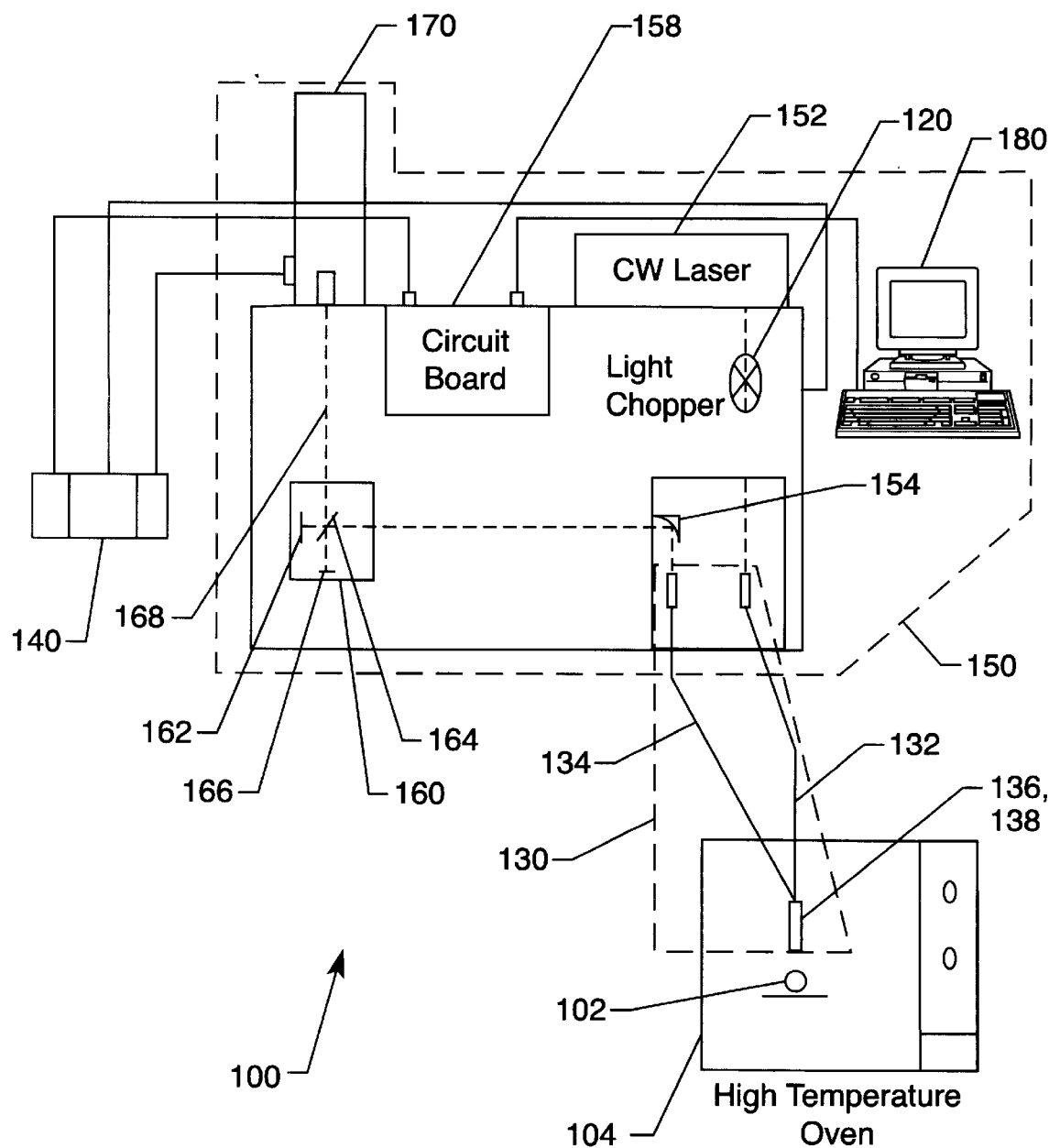
FIG. 3 is a schematic view of an apparatus for remotely analyzing a sample in a high-temperature oven in accordance with the present invention.

Referring now to FIG. 3, the preferred arrangement of an apparatus for remotely monitoring in real-time the reactions of a sample 102 located in a high-temperature oven 104 in accordance with the present invention is shown generally at 100. The apparatus comprises a Fourier Transform (FT) Raman spectrometer 150, a rotating mechanical optical chopper 120, a fiber-optic probe 130, and a dual phase, digital signal processor (DSP) lock-in amplifier 140. The FT Raman spectrometer 150 includes a continuous wave laser 152, sample collection optics 154, sample collection electronics 158, an interferometer 160 having a moving mirror 162, a detector 170, and a computer 180.

The continuous wave (CW) laser 152 irradiates the sample 102 at a selected wavelength of electromagnetic radiation suitable for Raman spectrometry. Preferably, the CW laser is a Nd:YVO$_4$ laser operating at the pre-selected wavelength of 1064 nanometers. The output from the CW laser 152 is passed through the rotating mechanical optical chopper 120, which is positioned between the sample 102 and the CW laser 152. The chopper 120 is electronically controlled via an internal oscillator (not shown) of the dual-phase DSP lock-in amplifier 140. A small fraction of the passed laser is sampled with a calibrated power meter which is part of the FT-Raman spectrometer 150. The optical chopper 120 modulates the electromagnetic radiation of the CW laser into pulses.

The chopped beam is focused onto the fiber-optical probe 130, which is positioned between the sample 102 and the rotating mechanical optical chopper 120. The fiber-optical probe 130 has two optical fibers 132, 134, each with a distal end 136, 138 placed in the sample 102 located within the high-temperature oven 104. The distal end 136 of the first optical fiber transmits the modulated (chopped) electromagnetic radiation onto the sample 102. The distal end 138 of the second optical fiber 134 has collinear collection fibers to collect both the thermal emission and the Raman scattered radiation from the sample and return it to the FT-Raman spectrometer 150. An example of a fiber-optical probe for conducting Raman spectroscopy remotely is given in U.S. Pat. No. 5,112,127, which is incorporated herein by reference. Use of the fiber optical probe is essential if maximum sample temperatures are to be reached. With fiber optics, saturation of the detector 170 occurs at approximately 380° C. However, when a heated sample stage was placed within the sample compartment of the FT Raman spectrometer, temperatures in excess of 300° C. could not be reached.

Sample collection optics 154 are operatively positioned at the other end of the second optical fiber 134 for collecting the thermal emission and the Raman scattered electromagnetic radiation of the sample 102 into a beam in a manner similar to what is described in the related art of U.S. Pat. No. 5,247,343, which is incorporated herein by reference. The interferometer 160, positioned within the FT Raman spectrometer 150 so as to receive the beam from the sample collection optics 154, manipulates the beam into an interference beam. The interferometer 160 comprises a beam splitter 164, the moving mirror 162, and a stationary mirror 166. Preferably, the beam splitter is a CaF$_2$ beam splitter. Advantageously, the moving mirror has a velocity of 0.4747 cm/s.

The detector 170 is positioned to receive optically the interference beam 168 and convert this beam into an electronic digital signal as is commonly understood by one with ordinary skill in the art. Preferably, the detector 170 is a liquid nitrogen-cooled germanium detector.

The dual-phase, DSP lock-in amplifier 140 is connected to the detector 170 in the following manner. The voltage output from the detector 170 (a BNC connector cable) is disconnected from the BNC connector (not shown) of the sample collection electronics or circuit board 158 of the FT-Raman spectrometer 150 and fed into the input channel of the dual-phase DSP lock-in amplifier 140. The X-output from the fast channel of the lock-in amplifier 140 is connected back to the BNC connector of the circuit board 158. The lock-in amplifier 140 demodulates and low-pass filters the electronic digital signal of the detector 170. The lock-in amplifier 140 is also electronically connected to the optical chopper 120. Specifically, the lock-in amplifier 140 is referenced to the frequency of the optical chopper 120, and the phases of the optical chopper and the lock-in amplifier are synchronized to facilitate demodulation of the interference beam 168. The lock-in amplifier 140 demodulates the output signal of the detector in a manner dependent upon both the maximum Stokes Raman wavenumber and the maximum anti-Stokes Raman wavenumber of the sample and upon the velocity of the moving mirror. The lock-in amplifier 140 also low-pass filters the output signal in a manner dependent upon the maximum anti-Stokes Raman wavenumber of the sample, the wavenumber of the CW laser, and the velocity of the mirror. This step of demodulating and low-pass filtering removes the thermal component of the Raman spectra reflected from the sample, as is further detailed below in the best mode of practicing the invention.

The circuit board 158 comprises sample collection electronics, connected to the lock-in amplifier 140, for acquiring the demodulated and low-pass filtered signal of the amplifier. The demodulated, filtered signal of the lock-in amplifier 140 is then transmitted to the computer 180 for Fourier-Transform processing and spectral acquisition.

The method for remotely monitoring high-temperature reactions of a sample in real-time comprises: (a) chopping electromagnetic radiation suitable for Raman spectrometry; (b) transmitting the electromagnetic radiation remotely onto the sample at high-temperature; (c) receiving the reflected electromagnetic radiation remotely from the sample, the reflected electromagnetic radiation including a thermal background; (d) manipulating the reflected electromagnetic radiation into an interference beam; (e) demodulating and low-pass filtering the interference beam to remove the thermal background from the electronic signal; and (f) performing a Fourier transform on the electronic signal to generate a Raman spectrum. An example of the present invention and the best mode of operating the method of the present invention follow.

EXAMPLE

The output from the CW laser (1064 nm) is passed through an optical chopper (EG&G PAR model 650) which is controlled via the internal oscillator of a dual-phase DSP lock-in amplifier (EG&G PAR model 7260). A small fraction of the passed laser is sampled with a calibrated power meter which is part of a Nicolet 950 FT-Raman spectrometer. The chopped beam is focused into a fiber-optic probe whose distal end is placed in the polymer sample within a temperature controlled oven. Collinear collection fibers collect both the thermal emission and the Raman scattered radiation and return it to the FT-Raman instrument. The voltage output from the detector (a BNC connector cable) is disconnected from the FT-Raman circuit board BNC connector and fed into the input channel of a dual-phase DSP lock-in amplifier. The X-output from the fast channel of the lock-in amplifier is connected back to the FT-Raman circuit board BNC connector. Spectral acquisition was performed using Nicolet Omnic software. Unless otherwise noted, a chop frequency of 2604.4 Hz was used and the time constant of the amplifier's digital filter output stage was set at 160 $\mu$s. Amplification of the detector signal was set at 0 dB and 1 volt full scale (i.e., no amplification).

For prior art Raman spectra, the optical chopper was adjusted so as not to interfere with the laser beam and the dual-phase DSP lock-in amplifier was disconnected from the instrument. In both types of examples, identical incident laser powers were used (200 mW). The FT-Raman spectrometer was equipped with a liquid nitrogen-cooled germanium detector, a CaF$_2$ beam splitter, and a Nd:YVO$_4$ laser (1064 nm). All spectra were acquired at 8 cm$^{-1}$ resolution, using Happ-Genzel apodization, and a mirror velocity of 0.4747 cm/sec, and consisted of a total of 100 scans (90 second total acquisition time). The temperature of the oven was continuously monitored using a thermocouple. The polymer sample used was phenyl-ethynyl terminated polyimide (PETI).

Figure 4:
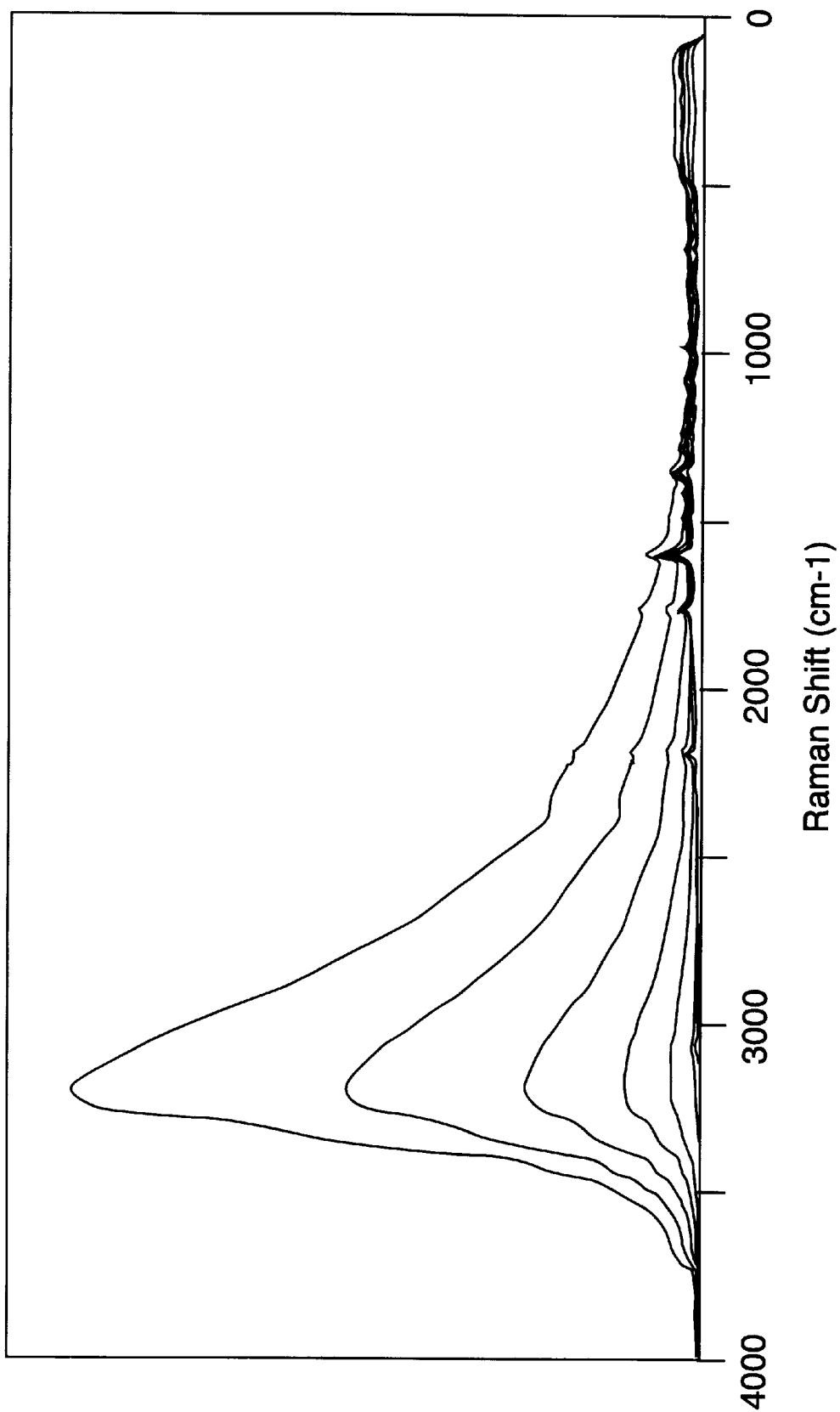
FIG. 4 is an in-situ fiber-optic FT-Raman spectra of a phenyl-ethynyl terminated polyimide (PETI) sample in an oven for various temperatures in accordance with the prior art.

The fiber optic FT-Raman spectra of the PETI sample acquired at various temperatures, before using the method of the present invention, are shown in FIG. 4. The temperatures of the oven are, from top to bottom, 350°, 325°, 300°, 275°, 250°, 100°, and 30° C. Incident laser power is 150 mW. A total of 100 scans were acquired for each spectrum. When heated to temperatures in excess of 350° C. for an extended time, the ethynyl functional groups of this polymer react to form a network whose properties are suitable for many demanding aerospace applications. As shown, when the oven temperature exceeds 200° C., a thermal background can be observed in the Stokes C-H stretching region of the spectrum. By the time the temperature reaches 300° C., the aromatic C-H stretch of the polymer can no longer be distinguished from the thermal background. At 350° C., the thermal background extends out into the fingerprint portion of the Stokes region. In addition to the loss of vibrational information, the thermal background also results in an increase in spectral noise. Hence both qualitative and quantitative observations are difficult to make. At 375° C., the thermal background resulted in a saturation of the A/D converter and no spectra could be collected.

Figure 5:
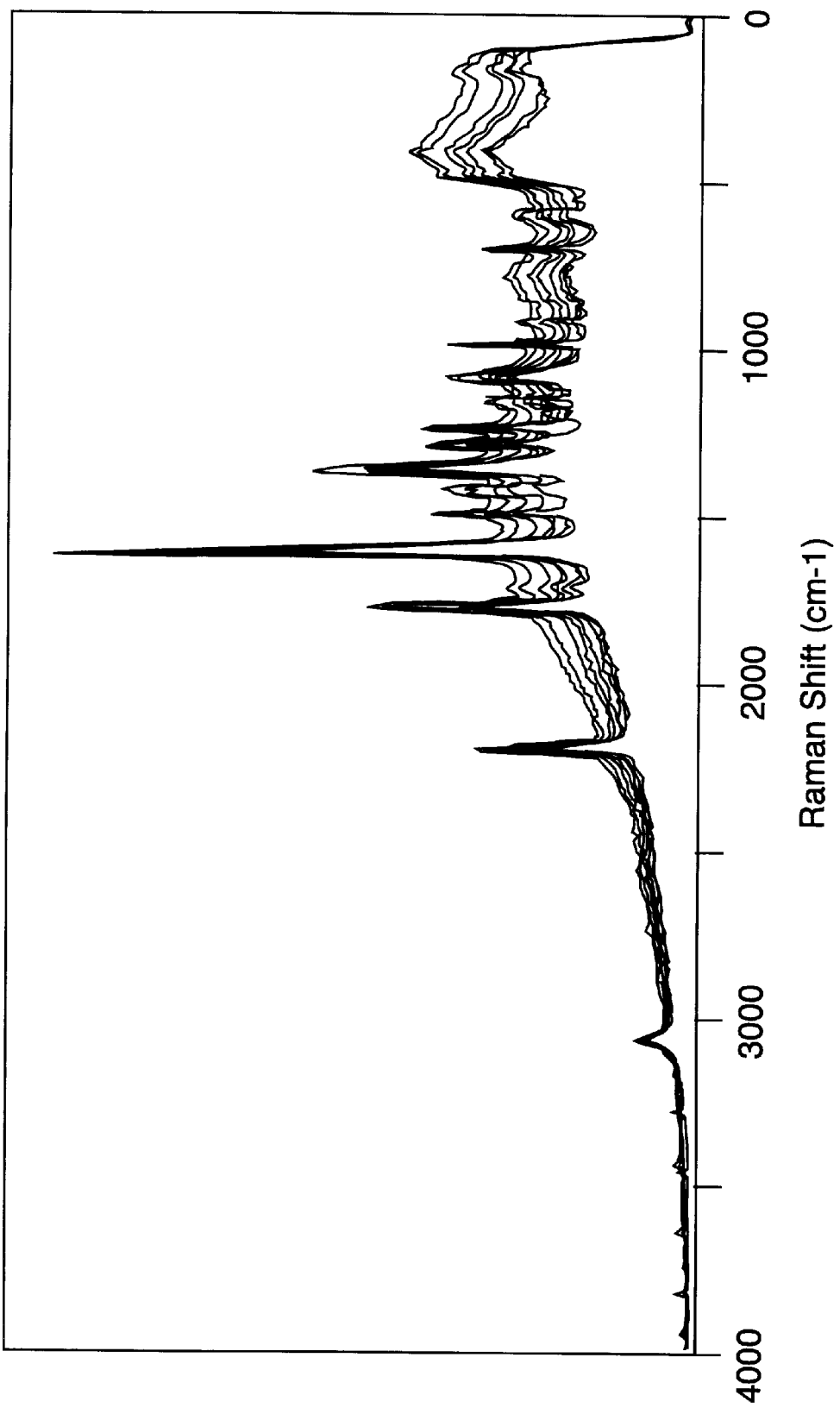
FIG. 5 is an in-situ fiber-optic FT-Raman spectra of a PETI sample in accordance with the present invention.
Figure 6:
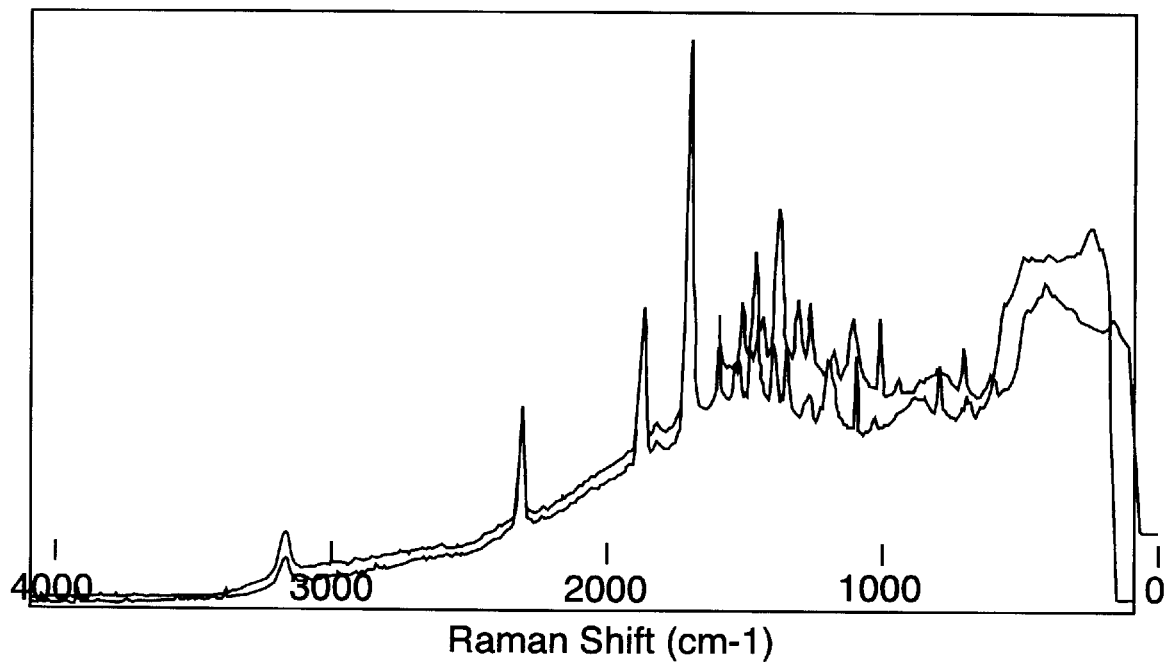
FIG. 6 is an overlay of fiber-optic FT-Raman spectra of a PETI sample at 30° C. both with and without the method of the present invention.
Figure 7:
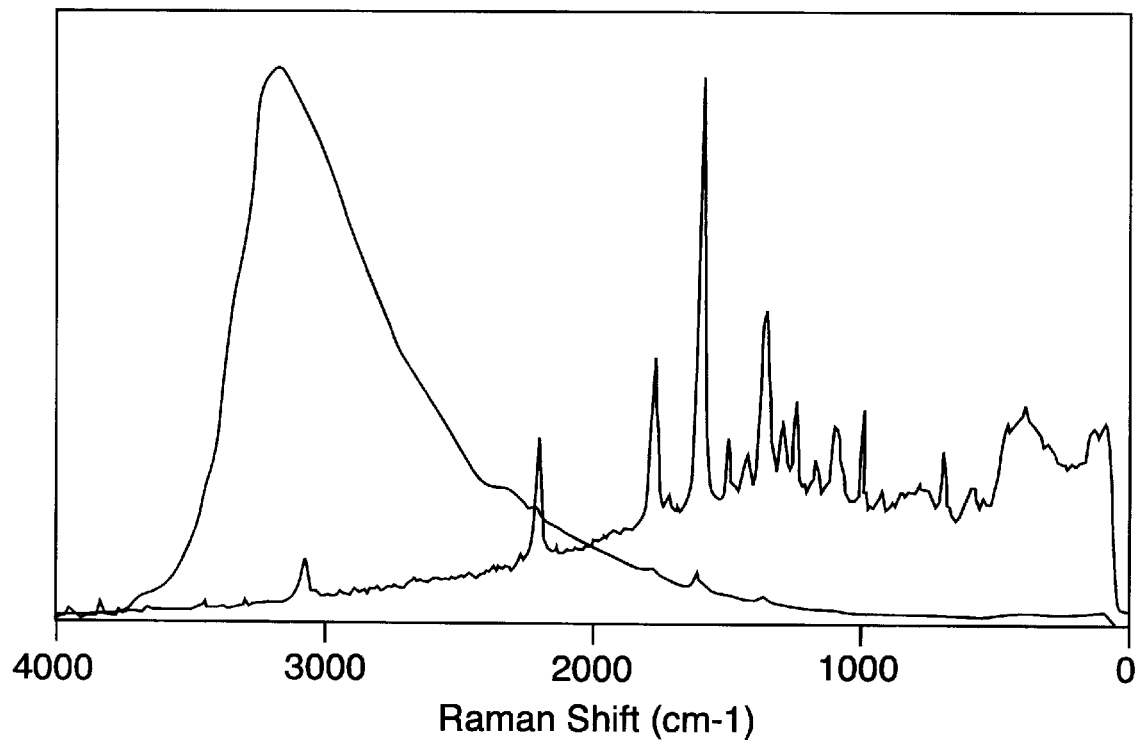
FIG. 7 is an overlay of fiber-optic FT-Raman spectra of a PETI sample at 350° C. both with and without the method of the present invention.

In contrast, when the laser is modulated at 2604.4 Hz using the optical chopper 120 and the detector output is locked-in using the dual-phase DSP lock-in amplifier 140 of the present invention, no thermal background is observed under identical conditions regardless of the temperature as shown in FIG. 5. A modulation frequency of 2604.4 Hz was used. The temperatures of the oven are, from bottom to top, 350°, 325°, 300°, 275°, 250°, 100°, and 30° C. Incident laser power is 150 mW. A total of 100 scans were acquired for each spectrum. A comparison of the resulting spectra from the two examples at the lowest temperature (30° C.) and the highest temperature (350° C.) is given in FIGS. 6 and 7, respectively. As shown in FIG. 6, the spectra are nearly identical. Relative peak intensities remain the same, as do bandwidth and resolution. The only noticeable difference is a slight decrease in the small fluorescent background for the modulated example.

Figure 8:
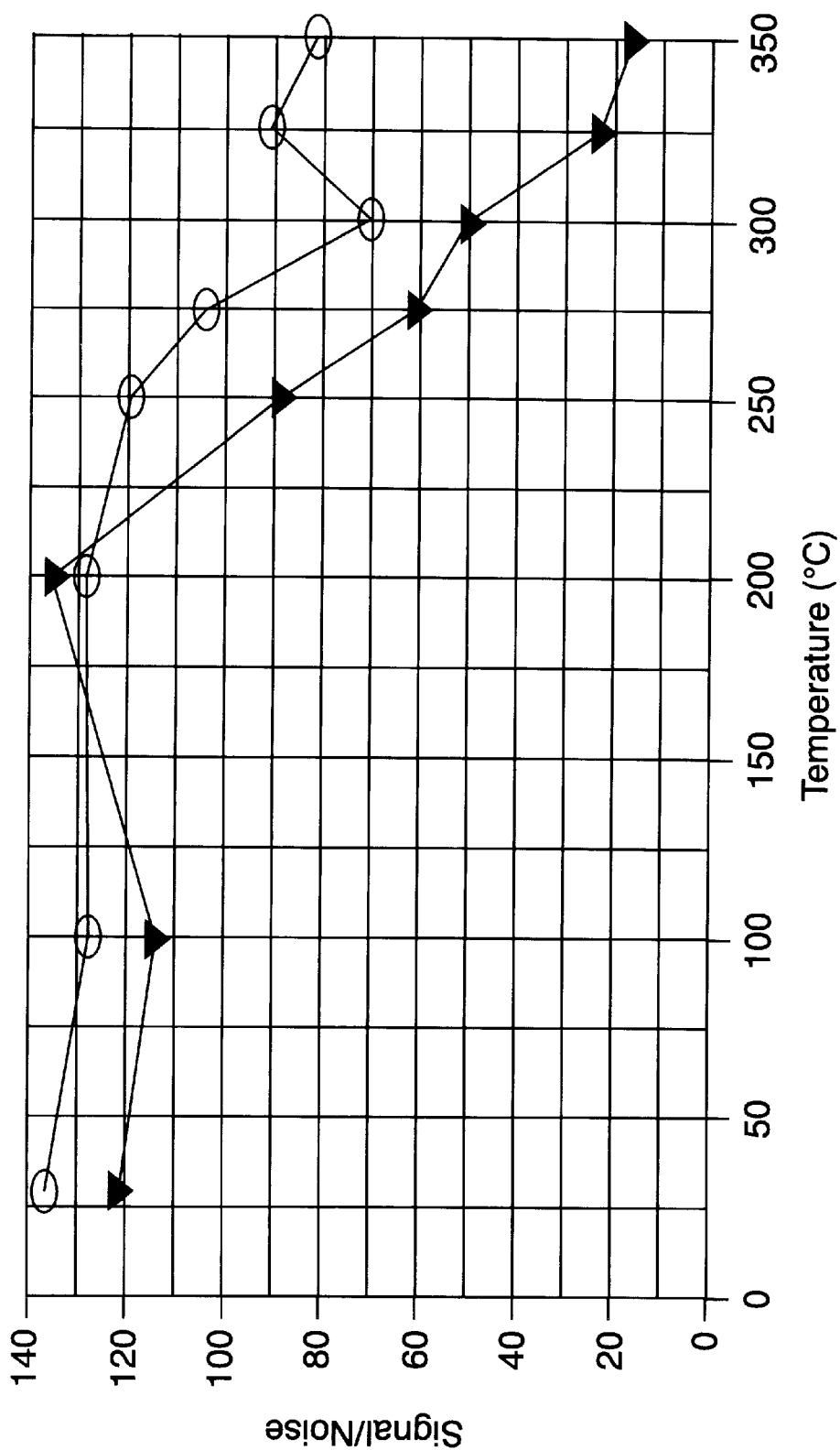
FIG. 8 is a plot comparing the signal-to-noise ratio of the present invention to the prior art.

FIG. 8 is a plot of the signal-to-noise as a function of temperature for Raman spectra acquired using a prior art FT-Raman spectrometer (triangles), and a FT-Raman spectrometer in accordance with the present invention (circles). For both the modulated and the prior art methods, the signal-to-noise ratio decreases as the temperature rises. However, note that the signal-to-noise ratio is higher for the present invention at both low and high temperatures.

Best Mode for Practicing the Invention

The method of the present invention has two modulations taking place. One involves the modulation of the laser ($v_m$) and hence the modulation of the Raman modes. The second modulation ($v_i$) is the result of the interferometer which results in all optical signals (including the thermal background) being modulated. Note that the $v_i$ term is wavelength dependent. For the Raman signal, the mixing of these two modulation frequency terms results in detection of three terms: $v_i$, $v_i+v_m$, and $v_i-v_m$ with an intensity ratio of 2:1:1, respectively. Because the thermal background is only modulated by the interferometer, its frequencies are solely determined by the interferometer, $v_i$, and no mixing occurs. If the lock-in amplifier 140 is referenced to the frequency of the laser modulation and the phases of the chopper 120 and the lock-in are synchronized (the purpose of the dual-phase option of the lock-in amplifier) then demodulation of the $v_i+v_m$ and $v_i-v_m$ terms yields a $v_i$ term, and demodulation of the $v_i$ term yields $v_i-v_m$ and $v_i+v_m$ terms with intensity ratios of 2:1:1, respectively. After performing a Fourier transform on these terms, three spectra are obtained. The $v_i$ term yields a normal Raman spectrum with the expected vibrational frequencies, while the other two terms correspond to identical spectra which are shifted to higher and lower frequencies by exactly the laser modulation frequency. The wavenumbers of these shifts is calculated by dividing the frequency by the interferometer mirror velocity in cm/s. For the thermal background, demodulation via the lock-in amplifier results in two frequency terms: $v_i+v_m$ and $v_i-v_m$. The final result after Fourier transformation is that there is no thermal component in the normal (unshifted) Raman spectrum.

Figure 9A:
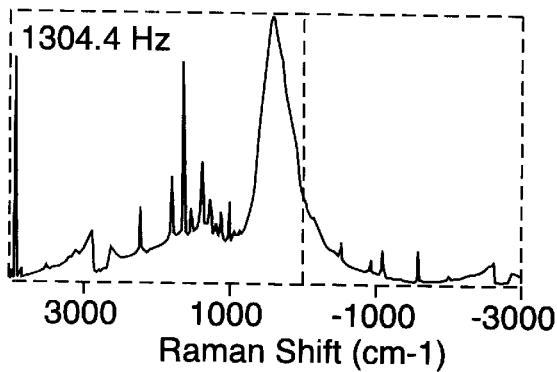
FIGS. 9A–9E show the FT-Raman spectra of a PETI sample, acquired in accordance with the present invention at 300° C., as a function of the modulation frequency.
Figure 9B:
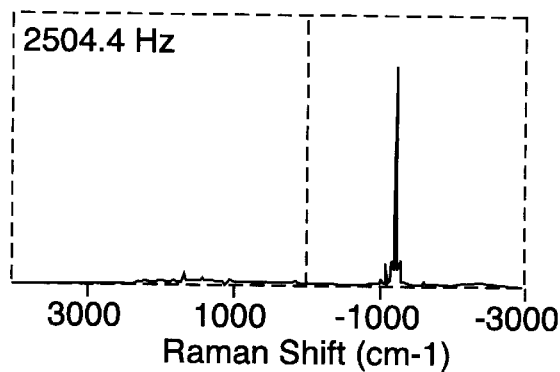

In FIG. 9A, the laser modulation frequency is 1304.2 Hz with an interferometer mirror velocity of 0.4747 cm/s. In addition to the normal Raman spectra, side spectra are expected at +/−2747.8 cm$^{-1}$. Perhaps the easiest portion of the side spectra to follow is the notch filter (centered at a Stokes shift of 0) which is shifted by +$v_m$ to give an apparent anti-Stokes shift of 2747.8 cm$^{-1}$, and is also shifted by −$v_m$ to give an apparent Stokes shift of 2747.8 cm$^{-1}$. As expected, the normal unshifted Raman spectrum is also present. The intense thermal peak is present in the prior art spectrum of FIG. 4 at approximately 3200 cm$^{-1}$. The shifted background ($v_i+v_m$) is expected at an apparent Stokes shift of 452 cm$^{-1}$, as is observed. The $v_i-v_m$ component of the thermal background is not observed because it lies outside of the spectral range (an apparent Stokes shift of +5948 cm$^{-1}$). Based on the spectrum in FIG. 9A, a consideration in using the method of the present invention is to choose a modulation frequency which is sufficiently large to shift the side spectra out of the range of the normal Raman spectrum. This criteria is met when $$v_m > (\bar{v}_S - \bar{v}_{AS}) * v_{mirror} \quad (1)$$

where $v_m$ is the laser modulation frequency in Hz, $v_{AS}$ is the maximum wavenumber at which anti-Stokes intensity is observed (expressed in terms of negative Raman shift), and $v_{AS}$ is the maximum wavenumber at which Stokes intensity is observed in an unmodulated example (expressed in terms of positive Raman shift), and $v_{mirror}$ is the velocity of the mirror in cm/s. For the PETI spectrum in FIGS. 9A–E, in the absence of heat, this would correspond to the Stokes shifted C-H stretch at 3050 cm$^{-1}$, and the decay of the fluorescence background to zero intensity at −1000 cm$^{-1}$ to give a minimum modulation frequency of 1922.5 Hz if all spectral components are to be resolved. With the addition of a thermal background which extends to +3800 cm$^{-1}$ before decaying to zero (FIG. 4), the modulation frequency must be increased to 2278.6 cm$^{-1}$.

A second consideration in the modulated example is the choice of digital low pass filters used following demodulation of the signals. It is essential that the low pass filter pass all of the high optical frequencies if the Raman intensities are not to be perturbed. For this to occur, the time constant of the filter must be less than the maximum spectral frequency which is not to be perturbed. For the PETI spectrum, the highest frequency component after lock-in demodulation corresponds to the fluorescent decay at −1000 cm$^{-1}$ (absolute frequency of 1000 cm$^{-1}$+9398.6 cm$^{-1}$=10398.5 cm$^{-1}$ or 4936.2 Hz). Therefore, a time constant of 202 $\mu$s or less would be required if the unshifted Raman spectrum is to appear as it would in the unmodulated example. If only the Stokes frequencies above 1000 cm$^{-1}$ are important, then the time constant could be increased to 226 $\mu$s. Unfortunately, for most DSP lock-in amplifiers, the filter time constant is not continuously tunable. For the system given in the example, the available time constants in the $\mu$s range begin at 10 $\mu$s and increase in a binary manner (e.g., 20, 40, 80, 160, 320, and 640 $\mu$s). The optimum selection for such a system would therefore be 160 $\mu$s. The general relation for the selection of the time constant is $$(\bar{v}_L - \bar{v}_{AS}) v_{mirror} < 1/\tau \qquad (2)$$

where $v_{AS}$ is the maximum anti-Stokes Raman wavenumber expressed in terms of negative shift, $v_L$ is the wavenumber of the laser, $v_{mirror}$ is the velocity of the mirror in cm/s, and $\tau$ is the time constant of the digital output filter in seconds.

Figure 9C:
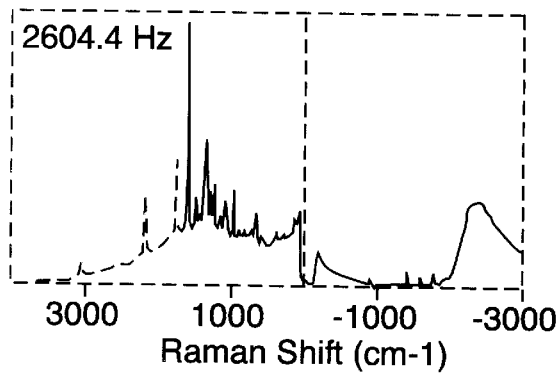
Figure 9D:
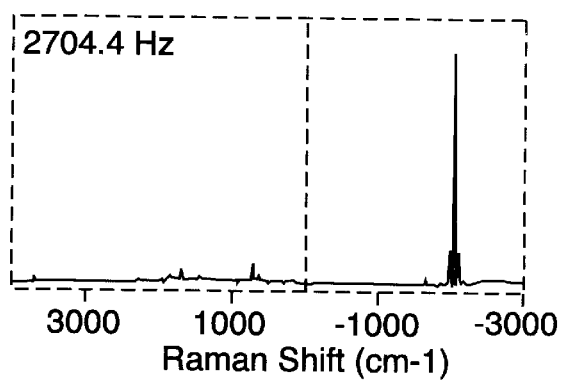
Figure 9E:
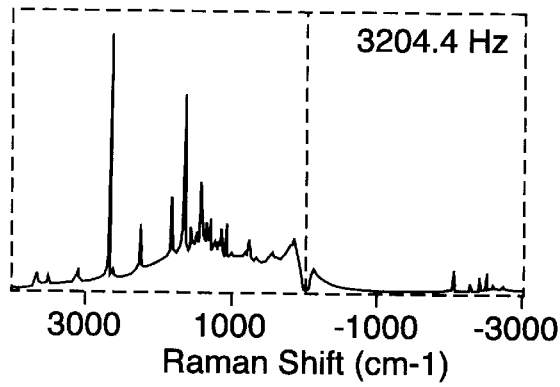
Figure 10A:
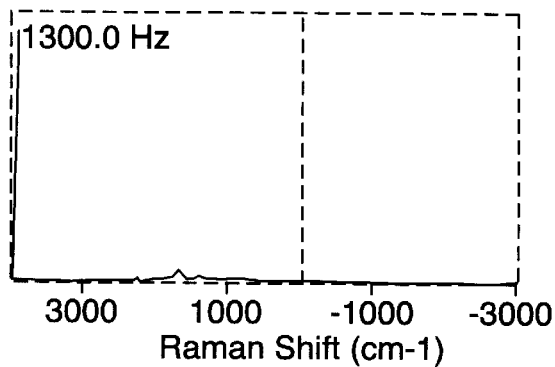
FIGS. 10A–10E show the FT-Raman spectra of a PETI sample acquired at room temperature as a function of modulation frequency.
Figure 10B:
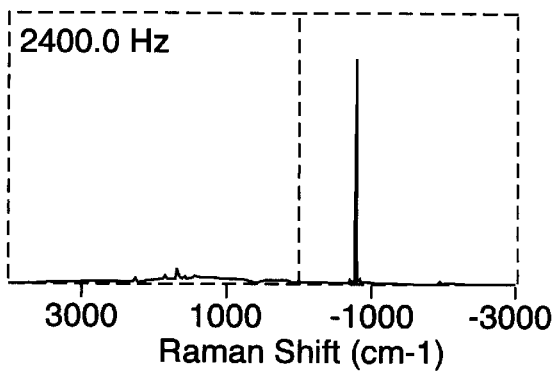
Figure 10C:
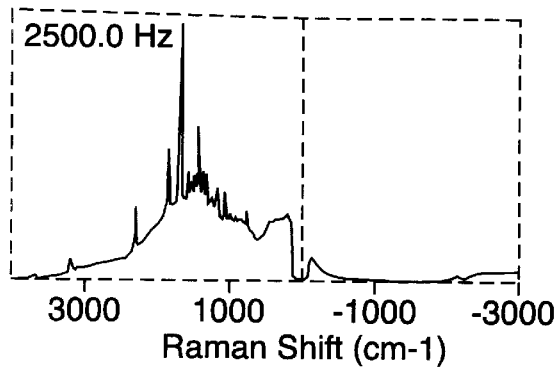
Figure 10D:
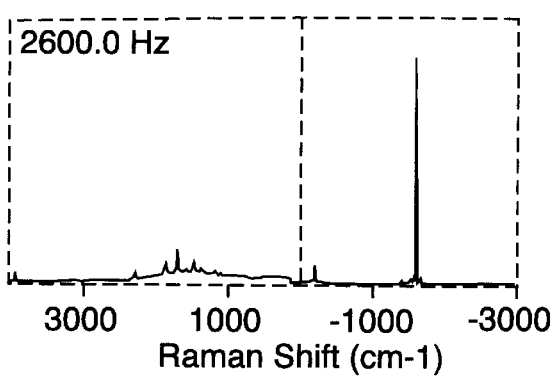
Figure 10E:
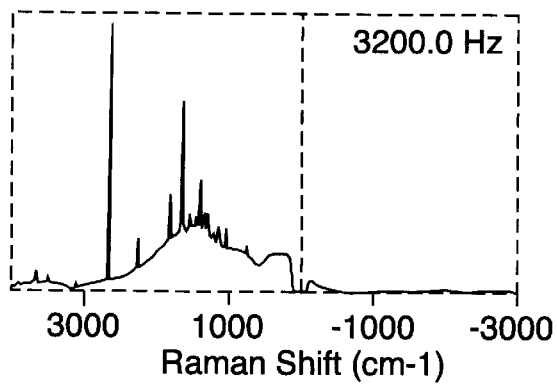

For the current DSP lock-in amplifier, the fast time constants required for the modulated example are limited to the fast output channel which has a filter slope of 6 dB/octave (an attenuation by 2 in amplitude for every twofold increase in frequency). This low slope value results in aliases not being fully attenuated. As shown in FIGS. 9A–9E, all of the spectra except for the one acquired with a modulation frequency of 2604.2 Hz, exhibit aliases at frequencies corresponding to n*$v_m$, where n is an integer. This alias results from the chopped Raman signal which is not modulated by the interferometer due to the interferometer having a non-unity efficiency. The result is that at the input of the lock-in amplifier, a DC square wave of frequency $v_m$, is introduced along with the interferometer frequency components discussed above. We have observed this square wave using an oscilloscope. When the square wave is demodulated at $v_m$, the result is a near-sinusoidal wave of frequency 2*$v_m$ (observed with an oscilloscope at the output channel). In the absence of output filtering, this alias results in an intense peak in the Raman spectrum regardless of the value of $v_m$. Because the alias frequencies lie in the same range as the optical frequencies, it is impossible to completely remove them with the output filter. However, if the A/D sampling frequency is a binary multiple of the modulation frequency (and hence the input square wave), the alias is completely eliminated with a time constant meeting the criteria of equation 3 as given below. The exact relation is $$(v_{A/D})/(2^n) = v_m \qquad (3)$$

where $v_{A/D}$ is the sampling frequency of the A/D converter, and n is an integer. In FIGS. 9A–9E, $v_m$ was 166,669 Hz. A value of n=6 for the above expression yields a modulation frequency of 2604.2 Hz, which is where the alias is eliminated (FIG. 9C). If a value of n=7 is used, a modulation frequency of 1302.1 Hz results. Experimentally this value also results in elimination of the alias frequencies (FIG. 9A still shows the remnants of the aliases since it was taken using a modulation frequency of 1304.4 Hz). As shown in FIGS. 10A–10E, if the A/D sampling frequency is shifted to 160,000 Hz, the alias frequencies are eliminated at 2500 Hz, as predicted. We have also collected spectra using a sampling frequency of 163,264 Hz which results in elimination of the alias frequencies when $v_m$=2551 Hz. We have also changed the mirror velocity to 0.316 cm/s, and equation 3 still remains valid for all three A/D sampling frequencies.

As described above, the modulated example results in a 50% decrease in the Raman intensity (the other 50% being split into the side spectra) relative to an example where no modulation is used. The fact that the signal-to-noise ratio for this technique is superior to that of the unmodulated technique even in the absence of heating suggests that lock-in amplifier digital filtering plays a significant role in reducing the ultimate spectral noise. The signal-to-noise data presented in FIG. 8 is based on the carbonyl stretching intensity (1770 cm$^{-1}$) for the intensity component, and the root-mean-squared noise of the adjacent spectral region (1900–2100 cm$^{-1}$). However, if the C-H stretching intensity (3050 cm$^{-1}$) is used, the signal-to-noise ratio for the unmodulated example would drop to 0 at a temperature of 325° C., because at this temperature the signal can no longer be observed. Thus, FIG. 8 dramatically understates the improvement in signal-to-noise ratio for the modulation method of the present invention when a thermal background is present.

Figure 11:
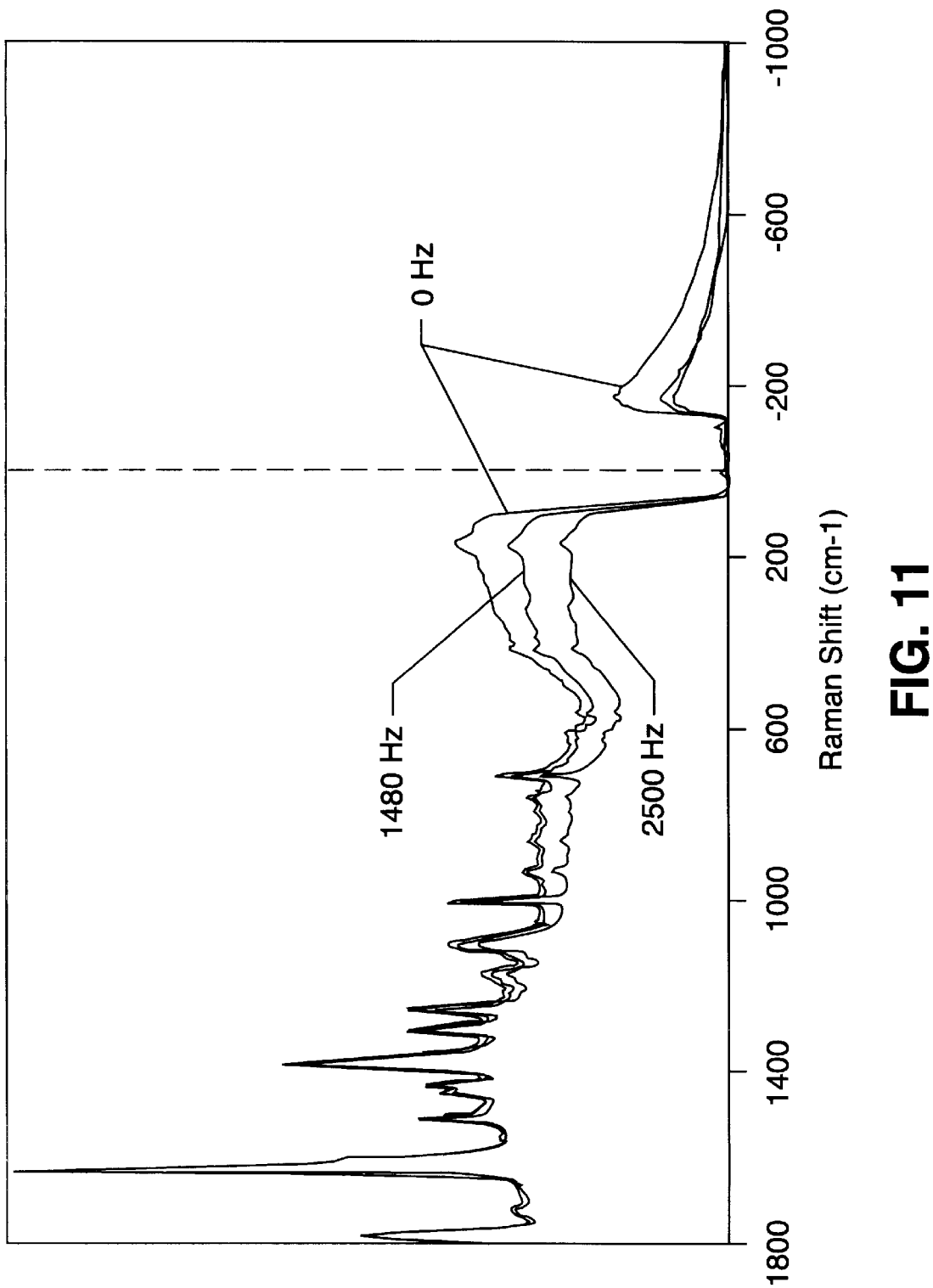
FIG. 11 is an overlay of intensity normalized Raman spectra acquired using the present invention at 2500 Hz, 1480 Hz, and 0 Hz.

FIG. 11 displays three (3) overlaid spectra of a PETI sample taken at room temperature and at three different modulation frequencies: 0 Hz, 1480 Hz, and 2500 Hz. As $v_m$ is increased, the slight fluorescent background decreases. This background cannot be due to glass Raman modes because these spectra were acquired within the sample compartment not using fiber-optics. It is reasonable that this decrease is due to the temporal discrimination of the modulation technique. The Raman signal is instantaneous on the timescale of the instrument, however, the fluorescent state may have a lifetime which approaches that of $v_m^{-1}$. In this case, some of the fluorescent intensity would occur during the "off" portion of the modulation cycle, and not be sampled by the lock-in amplifier. This suggests that for samples with long-lived emitting states which can be populated with 1064 nm radiation, the modulation technique may significantly reduce the fluorescent background.

Figure 12:
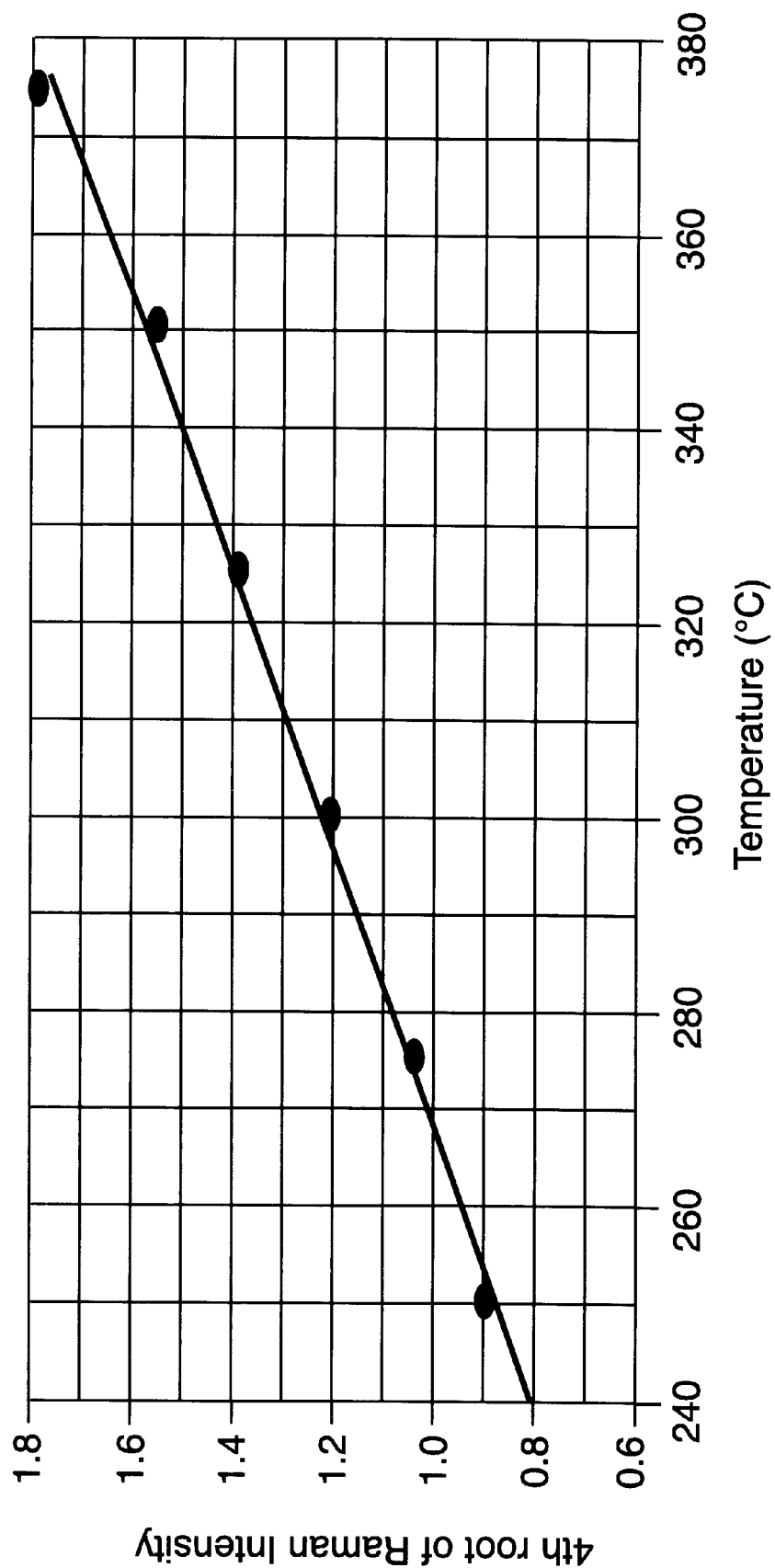
FIG. 12 is a calibration curve for various temperatures using the shifted and digitally-filtered thermal peak intensity observed in the anti-Stokes region when modulating at 2604.4 Hz.

In FIG. 4, the unmodulated technique results in a thermal peak whose intensity increases with temperature. The peak shape is a result of a drop off in the Ge detector sensitivity. When the modulation frequency is set to 2604.2 Hz, this thermal "peak" is shifted to the anti-Stokes region of the spectrum as shown in FIG. 9C. In addition to being shifted, the peak is also attenuated. Part of this attenuation is due to the $\tau$=160 $\mu$s output filter of the lock-in amplifier, while some of the intensity is due to the splitting of the total intensity between the $v_i$+$v_m$ and $v_i$–$v_m$ components. The net result at 300° C. is a thermal "peak" with an intensity which is similar to that of the Raman modes. For black body radiation, the total integrated intensity is related to the temperature by $$T = kI^{1/4} \qquad (4)$$

where k is a constant. As shown in FIG. 12, a plot of this equation for the modulated example results in a linear relationship with a correlation coefficient of 0.991. This equation is only an approximation because the intensity of the blackbody radiation is also a function of the filter and only a portion of the blackbody radiation is collected. However, it does demonstrate that the resulting signal from the modulated example can be used to monitor the sample temperature. A more accurate calibration could be obtained by fitting a line to the data for a particular system.

The present invention has several advantages, which include the collection of FT Raman spectra at high temperatures using fast interferometer mirror velocities without any peak distortion, use of existing software for data collection, and moderate upgrade cost. Additionally, the signal-to-noise ratio for the spectral data collected with the present invention exceeds that of the commercial FT-Raman spectrometer under identical conditions at both room temperature and at high temperatures. The present invention does not distort the intensities of the Raman modes if the digital filter is selected in accordance with the above-described equations.

The invention can be practiced in other manners than are described herein without departing from the spirit and the scope of the appended claims.

What is claimed is:

1. An apparatus for analyzing a sample, comprising:

(a) a continuous wave laser for irradiating the sample at a selected wavelength of electromagnetic radiation suitable for Raman spectrometry;

(b) a rotating mechanical optical chopper, positioned between the sample and said continuous wave laser, for modulating the electromagnetic radiation of said continuous wave laser into pulses;

(c) a fiber-optical probe, positioned between the sample and said rotating mechanical chopper, said fiber-optical probe having two optical fibers, each with a distal end, the distal end of the first optical fiber transmitting the modulated electromagnetic radiation onto the sample, the distal end of the second optical fiber receiving the reflected electromagnetic radiation from the sample;

(d) sample collection optics, operatively positioned at the other end of the second optical fiber, for collecting the reflected electromagnetic radiation of the sample into a beam;

(e) an interferometer, mounted to receive the beam from said sample collection optics, for manipulating the beam into an interference beam, said interferometer comprising a beamsplitter, a moving mirror, and a stationary mirror;

(f) a detector, positioned to receive the interference beam optically, for detecting the wavelengths of the interference beam and generating an output signal;

(g) a dual-phase, digital signal processor lock-in amplifier, connected to said detector and said optical chopper, for demodulating and low-pass filtering the output signal of said detector; and, (h) sample collection electronics, connected to said dual-phase digital signal processor lock-in amplifier, for acquiring spectrally the demodulated and filtered signal of said amplifier.

2. The apparatus of claim 1 wherein said continuous wave laser is a Nd:YV0$_4$ laser.

3. The apparatus of claim 1 wherein the selected wavelength is 1064 nanometers.

4. The apparatus of claim 1 wherein said detector is liquid nitrogen cooled.

5. The apparatus of claim 4 wherein said detector is a germanium detector.

6. The apparatus of claim 1 wherein the beam splitter is a CaF$_2$ beam splitter.

7. The apparatus of claim 1 further comprising a computer for processing the spectrally acquired signal of said sample collection electronics.

8. A method for remotely monitoring high-temperature reactions in real time, comprising:

(a) chopping electromagnetic radiation suitable for Raman spectrometry;

(b) transmitting the electromagnetic radiation remotely onto a sample at high-temperature;

(c) receiving the reflected electromagnetic remotely radiation from the sample, said reflected electromagnetic radiation including thermal background;

(d) manipulating the reflected electromagnetic radiation into an interference beam;

(e) demodulating and low-pass filtering the interference beam to remove the thermal background from the electronic signal; and (f) performing a Fourier transform on the electronic signal to generate a Raman spectrum.

9. An apparatus for remotely analyzing a sample at high temperatures, comprising:

(a) means for performing Fourier-Transform Raman spectrometry, said means comprising a continuous wave laser for irradiating the sample, sample collection optics, an interferometer for producing an interference beam, a detector for converting the interference beam into an electronic digital signal, and a computer;

(b) means for chopping electromagnetic radiation of the continuous wave laser into pulses, said means for chopping being positioned between the sample and the continuous wave laser;

(c) means for remotely transmitting the pulsed electromagnetic radiation onto the sample and the reflected electromagnetic radiation from the sample back to the sample collection optics of said means for performing Fourier-Transform Raman spectrometry, said reflected electromagnetic radiation including thermal background; and (d) means, connected to said means for performing Fourier-Transform Raman spectrometry and said means for chopping, for demodulating and filtering the electronic digital signal of said means for performing so as to remove the thermal component of the signal.

* * * * *